United States Patent [19]

Horowitz

[11] E Patent Number: Re. 32,844

[45] Reissued Date of Patent: Jan. 24, 1989

[54] CANOE CADDY

[76] Inventor: Justin Horowitz, 3276 Dutchtown Rd., Saugerties, N.Y. 12477

[21] Appl. No.: 89,667

[22] Filed: Aug. 25, 1987

Related U.S. Patent Documents

Reissue of:

[64] Patent No.: 4,538,829
Issued: Sep. 3, 1985
Appl. No.: 610,907
Filed: May 16, 1984

[51] Int. Cl.[4] ..... B60P 3/10

[52] U.S. Cl. ..... 280/641; 114/344; 280/43.16; 280/47.331

[58] Field of Search ..... 280/43.16, 47.13 R, 280/47.13 B, 47.18, 414.1, 414.2, 641; 414/444, 457, 462; 224/310; 114/344

[56] References Cited

U.S. PATENT DOCUMENTS

| | | | |
|---|---|---|---|
| 2,668,061 | 2/1954 | Kuda | 280/35 |
| 2,970,846 | 3/1961 | Boston | 280/40 |
| 3,093,386 | 6/1963 | Case | 280/42 |
| 3,445,018 | 5/1969 | Reagan | 214/450 |
| 3,860,255 | 1/1975 | Rodriguez | 280/43.19 |
| 3,917,083 | 11/1975 | Carn | 214/38 CA |

*Primary Examiner*—David M. Mitchell
*Assistant Examiner*—Michael Mar
*Attorney, Agent, or Firm*—Parmelee Bollinger & Bramblett

[57] ABSTRACT

A canoe caddy having a frame adapted to support one end of a canoe or boat thereon, front ground-engaging wheels, and rear ground-engaging wheels. The frame is held straight over the top of the wheels in a first position which is useful for attaching one end of a canoe in an inverted position thereon, for moving such canoe near a vehicle, and for loading such canoe onto or off from a car top carrier or the like. Once the canoe and caddy are loaded onto such car top carrier, then the caddy can be loaded to a more compact position. The caddy is also useful in a third position whereby the frame is rotated over the front wheels thereof for receiving a canoe in an upright position on one end thereof for permitting one person to easily transport the canoe to the water's edge for launching such canoe into the water using such caddy.

20 Claims, 3 Drawing Sheets

Fig. 7
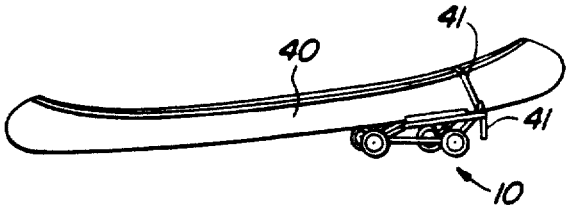
Fig. 8
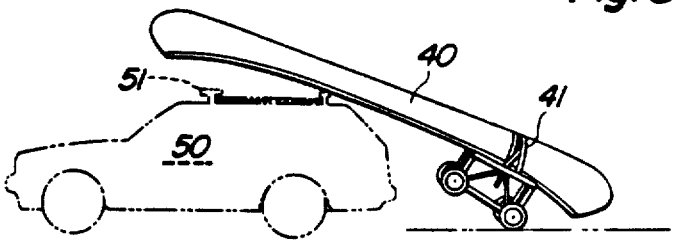
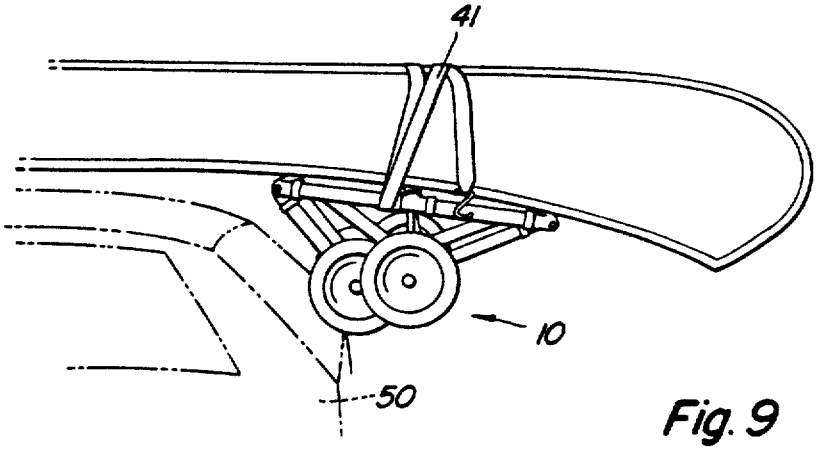
Fig. 9

CANOE CADDY

Matter enclosed in heavy brackets [ ] appears in the original patent but forms no part of this reissue specification; matter printed in italics indicates the additions made by reissue.

TECHNICAL FIELD

The present invention relates generally to an apparatus for aiding in the transporting of a boat or canoe from place to place, for launching of such vessel, or for loading it onto a car top carrier or the like, and more particularly to such an apparatus which requires only one person to accomplish these functions.

BACKGROUND ART

Various mechanisms have been devised over the years for permitting one person to load canoes or boats onto the top of a vehicle for transportation from place to place. Similarly, various mechanisms have been devised for manually moving a canoe or boat from place to place. Additionally, numerous devices have been devised for aiding in the launching of boats or canoes into the water. Many of the aforementioned mechanisms have wheeled assemblies for attachment to such boats or canoes so that one person can accomplish the proposed functions.

One problem with the prior art is that none of the mechanisms devised heretofore have been versatile enough for use to load or unload onto a conventional car top carrier or the like, for transporting from place to place and for launching of the vessel.

U.S. Pat. No. 3,445,018 to Reagan discloses a mechanism for accomplishing two of the three above mentioned tasks using only one person, but such mechanism does not utilize a conventional car top carrier and requires specially made parts for the rear of the car, the rear of a boat, and a special car top carrier apparatus not useful for other purposes.

Consequently, there exists a need for an apparatus more useful to permit one person to transport, launch, load onto a conventional car top carrier, or unload.

DISCLOSURE OF THE INVENTION

The present invention relates to a canoe caddy having a frame adapted to support one end of a canoe or boat thereon, front ground-engaging wheels, and rear ground-engaging wheels. The frame is held straight over the top of the wheels in a first position which is useful for attaching one end of a canoe in inverted position thereon, for moving such canoe near a vehicle, and for loading such canoe onto a car top carrier or the like. Once the canoe and caddy are loaded onto such car top carrier, then the caddy can be folded to a more compact position. The caddy is also useful in a third position whereby the frame is rotated over the front wheels thereof for receiving a canoe in an upright position on one end thereof for permitting one person to easily transport the canoe to the water's edge for launching such canoe into the water using such caddy.

An object of the present invention is to provide an improved canoe caddy for permitting one person to transport, launch, and to load or unload such canoe with respect to a car top carrier on a motor vehicle.

Another object of the invention is to provide a canoe carrier of the aforementioned type which is useful in conjunction with conventional car top carriers and which requires no other specially constructed parts.

A further object of the invention is to provide a canoe caddy of the aforementioned type which is economical to construct and easy to use.

Other objects, advantages and novel feeatures of the present invention will be apparent from the following detailed description of the invention in conjunction with the accompanying drawings.

BRIEF DESCRIPTION OF THE DRAWINGS

FIG. 1 shows a side perspective view of the present invention in a position to accept one end of the canoe in an inverted position so that it can be loaded onto a car top carrier or the like.

FIG. 7 is a side view of a canoe loaded onto a canoe caddy in the launch position shown in FIGS. 4–6 in readiness to be launched into the water;

FIG. 8 is a side view of the present invention shown in the upright position thereof as shown in FIGS. 1–3 and also being attached to the canoe in an inverted position and in the process of being loaded onto a car top carrier; and FIG. 9 is an enlarged side view of the present invention with the canoe loaded onto the car top carrier and the canoe caddy being in a folded and compact position.

BEST MODE FOR CARRYING OUT THE INVENTION

Figure 1:
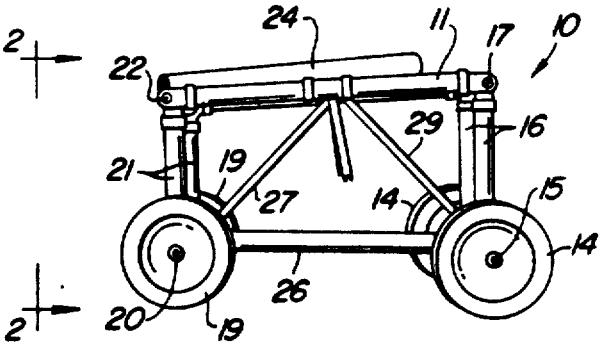

Referring now to the drawings wherein like reference numerals designate identical or corresponding parts throughout the several views, FIG. 1 shows a canoe caddy (10) constructed in accordance with the present invention. The canoe caddy (10) includes a frame constructed of side members (11), a front member (12), and a rear member (13). Front wheels (14) are rotatably attached on axles (15) and such axles (15) are upwardly attached to front members (16). These front members (16) are pivotally attached to the frame by a rod (17) which extends through the front member (12) of the frame.

Similarly, rear wheels (19) are rotatably mounted on an axle (20), and this axle (20) is upwardly attached to rearwardly extending member (21). These rear members (21) are pivotally attached to the frame by a bolt (22) extending through the rear member (13) of the frame. Canoe guiding members (23) and (24) are bolted to a central frame member (25) as well as to the rear structure frame member (13). It is noted that the front wheels (14) are spaced apart farther than the rear wheels (19) so that they can move to the folded position as shown in FIG. 9, as will be explained below.

Figure 2:
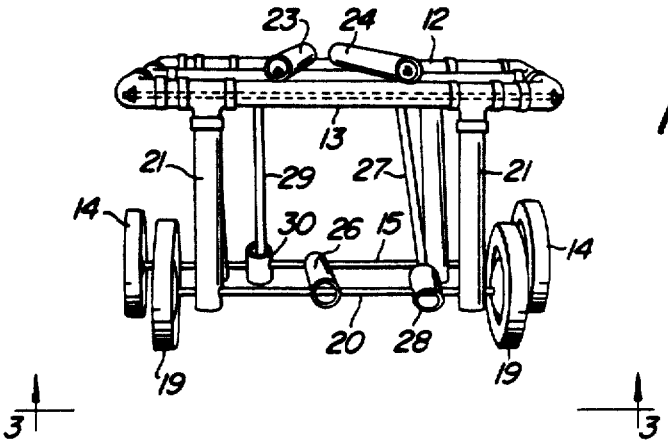
FIG. 2 is a rear view taken along line 2—2 of FIG. 1.
Figure 3:
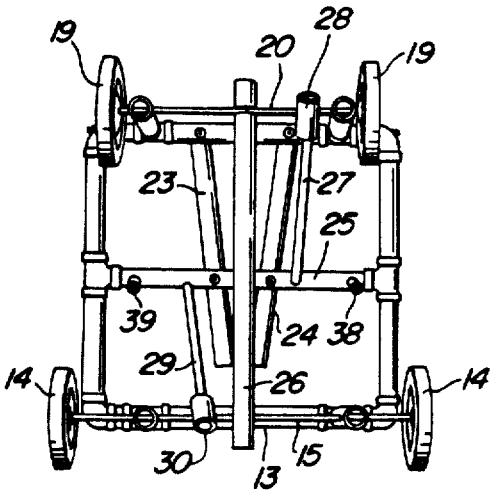
FIG. 3 is a bottom view taken along line 3—3 of FIG. 2.

Referring again to FIGS. 1–3, it is noted that a strut (26) is pivotally attached to the front axle (15) and the strut member (26) has a slot in the rear end thereof so that it can slip over the rear axle (20) to hold these axles (15) and (20) at a predetermined distance apart. It is also noted that a strut member (27) can be positioned between the central member (25) of the frame and a socket (28) attached to the rear axle (20) for receiving the other end of the strut member (27). Similarly, the strut member (29) is attached into a hole in central frame member (25) and the other end thereof is received in a socket (30) attached to front axle (15). When the apparatus (10) is in the position shown in FIGS. 1–3 it is useful to attach a canoe (40) thereon by use of a strap (41) or the like whereby one person can hold on to the other end of the canoe (40) to transport it adjacent to a car (50) having a car top carrier (51) attached to the top thereof and then to push such canoe (40) onto the top of the car (50) to the position shown in FIG. 9. Once this is done, then the strut members (26), (27), and (29) are disengaged whereby the axles (20) and (15) can be brought in close proximity to each other and tied together or held together by slots in members (28) and (30) which will tie the two axles (20) and (15) together to hold it in the compact position shown in FIG. 9.

Figure 4:
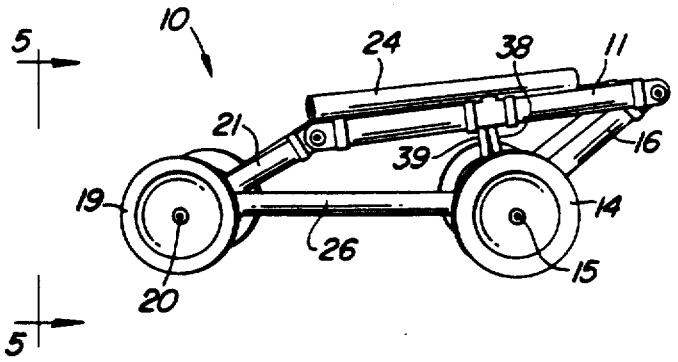
FIG. 4 is a side view, like FIG. 1, but showing the apparatus in a position to be used for launching a canoe by placing one end of the canoe thereon in an upright position as shown below in FIG. 7.
Figure 5:
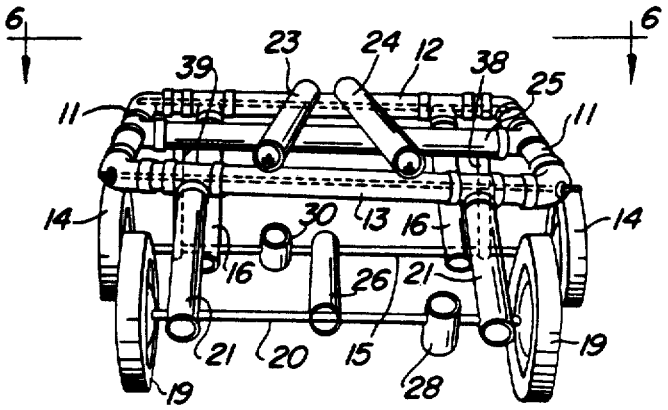
FIG. 5 is a rear view of the apparatus in a launch position as taken along line 5—5 of FIG. 4.
Figure 6:
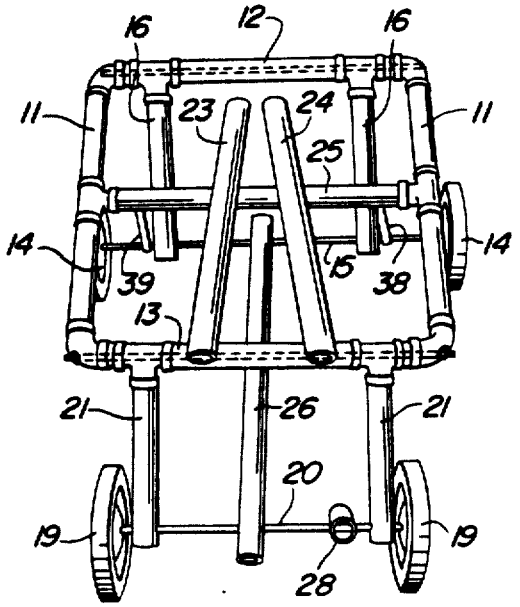
FIG. 6 is a top view of the apparatus shown in a launch position and taken along line 6—6 of FIG. 5.

Referring now to FIGS. 4–6, it is noted that the apparatus (10) can be moved to a canoe launching position whereby the frame is moved over and above the front wheels (14). This movement of the frame from the position shown in FIGS. 1–3 to the position shown in FIGS. 4–6 is accomplished by leaving the strut members (26) in place to maintain the axles (15) and (20) a predetermined distance apart, but removing the strut members (27) and (29) whereby the frame can be rocked forwardly. Two additional strut members (38) and (39) are rigidly attached to central frame member (25) and have slots in the end thereof so that the axle (15) can be received in these slots. Consequently, the struts (38) and (39) will hold the frame upwardly to the position shown in FIG. 4 when the strut members (38) and (39) are so engaged with axle (15).

To launch the canoe (40) using the apparatus (10) in a launch position shown in FIGS. 4–6, it is noted that the canoe (40) is strapped with a strap (41) in an upright position so that one end of the canoe (40) is supported by the canoe caddy (10) and the other end of the canoe (40) can be picked up by one person to wheel such canoe (40) to the water's edge and then into the water by rolling the canoe on just the front wheels (14) of the canoe caddy (10). Once the canoe (40) is in the water, then the strap (41) is removed, and the canoe caddy is left on shore, or alternately is stored in the canoe, until its use is needed again.

Accordingly, it will be appreciated by viewing FIGS. 7–9 that the canoe caddy (10) can be used to launch a canoe by using it as shown in FIG. 7, can be used to load a canoe onto a car top carrier as shown in FIG. 8, can be stored and transported with the canoe as shown in FIG. 9, and can be used to remove a canoe (40) from a car top carrier by movement towards the position shown in FIG. 8.

Accordingly, it will be appreciated from the aforementioned description that the preferred embodiment of the invention does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A canoe caddy comprising:

a frame adapted to support one end of a canoe thereon, front ground-engaging wheel means, front arm means for pivotally attaching said front ground-engaging wheel means to a front portion of said frame, said front ground-engaging wheel means being rotatably disposed along a first horizontal axis adjacent a bottom portion of said arm means;

rear ground-engaging wheel means, rear arm means for pivotally attaching said rear ground-engaging wheel means to a rear portion of said frame, said rear ground-engaging wheel means being rotatably disposed along a second horizontal axis parallel to said first horizontal axis;

first positioning means for selectively securing said front and rear arm means in a substantially vertical position for holding said frame *in a full-height, substantially level position* directly over said first and second wheel means thereby permitting a canoe while in an inverted position, to be strapped onto said frame and easily loaded onto a carrier rack disposed on top of a vehicle;

second positioning means for selectively securing said front and rear arm means in a folded position wherein said front and rear ground-engaging wheel means are folded upwardly and inwardly towards each other to form a compact unit for travel while said frame is strapped to the canoe in said inverted position and the canoe is mounted on a vehicle top carrier rack; and third positioning means for selectively holding said frame in a lowered, inclined position *with said arm means pivoted from their vertical positions* wherein said frame is secured substantially over said front wheel means and said rear wheel means is secured outwardly of said frame, whereby one end of the canoe, while in an upright position, can be supported on said frame and the other end of the canoe can be picked up for wheeling the canoe into the water.

2. The apparatus of claim 1 including means for holding said one end of the canoe onto said frame.

3. The apparatus of claim 1 including means attached to the top of said frame for guiding a canoe in an upright position thereof onto said frame.

4. The apparatus of claim 1 wherein said frame and said front and rear arm means are constructed of stiff plastic pipes for withstanding wet conditions without deteriorating.

5. The apparatus of claim 1 wherein said front wheel means includes a front axle and said rear wheel means includes a rear axle.

6. The apparatus of claim 5 wherein said first positioning means includes a strut for selectively holding said front and rear axles apart by a predetermined distance, a second strut member disposed between an intermediate portion of the frame and a said rear axle, and a third strut member disposed between an intermediate portion of the frame and said front axle.

7. The apparatus of claim 5 wherein said second positioning means comprises means for selectively holding said front and rear axles together in close proximity to each other in said folded upwardly and inwardly positions.

*8. A canoe caddy comprising:*

*a frame adapted to support a canoe thereon;*

*front ground-engaging wheel means;*

*front arm means pivotally attaching said front ground-engaging wheel means to a front portion of said frame, said front ground-engaging wheel means being rotatably disposed along a first horizontal axis adjacent a bottom portion of said arm means;*

*rear ground-engaging wheel means;*

*rear arm means pivotally attaching said rear ground-engaging wheel means to a rear portion of said frame, said rear ground-engaging wheel means being rotatably disposed along a second horizontal axis parallel to said first horizontal axis;*

*first positioning means for selectively securing said front and rear arm means in a substantially vertical position for holding said frame in a full-height, substantially level position directly over said first and second wheel means thereby permitting a canoe while in an inverted position, to be strapped onto said frame and easily loaded onto a carrier rack disposed on top of a vehicle; and*

*second positioning means for selectively holding said frame in a lowered, inclined position with said arm means pivoted from their vertical positions wherein said frame is secured substantially over said front wheel means and said rear wheel means is secured outwardly of said frame, whereby the canoe, while in an upright position, can be supported and the canoe can be wheeled into the water.*

*9. A canoe caddy as defined in claim 8 and further comprising:*

*third positioning means for selectively securing said front arm means in a folded position wherein said front ground-engaging wheel means are folded upwardly and inwardly towards the frame to form a compact unit for travel while said frame is strapped to the canoe in an inverted position and the canoe is mounted on a vehicle top carrier rack.*

*10. A canoe caddy as defined in claim 9 wherein said third positioning means is also for selectively securing said rear arms in a folded position wherein said rear ground-engaging wheels are folded upwardly and inwardly toward the frame to form a compact unit for travel while said frame is strapped to the canoe in an inverted position and the canoe is mounted on a vehicle top carrier rack.*

*11. A canoe caddy as defined in claim 10 including means for releasably holding said canoe on said frame.*

*12. A canoe caddy as defined in claim 10 including means attached to the top of said frame for guiding a canoe in an upright position thereof onto said frame.*

*13. A canoe caddy as defined in claim 10 wherein said frame and said front and rear arm means are constructed of stiff plastic pipes for withstanding wet conditions without deteriorating.*

*14. A canoe caddy as defined in claim 10 wherein said front wheel means includes a front axle and said rear wheel means includes a rear axle.*

*15. A canoe caddy as defined in claim 14 wherein said first positioning means includes a strut for selectively holding said front and rear axles apart by a predetermined distance, a second strut member disposed between an intermediate portion of the frame and said front axle.*

*16. A canoe caddy as defined in claim 14 wherein said third positioning means comprises means for selectively holding said front and rear axles together in close proximity to each other in said folded upwardly and inwardly positions.*

*17. A canoe caddy as defined in claim 8 including means for releasably holding said canoe on said frame.*

*18. A canoe caddy as defined in claim 8 including means attached to the top of said frame for guiding a canoe in an upright position thereof onto said frame.*

*19. A canoe caddy as defined in claim 8 wherein said frame and said front and rear arm means are constructed of stiff plastic pipes for withstanding wet conditions without deteriorating.*

*20. A canoe caddy as defined in claim 8 wherein said front wheel means includes a front axle, said rear wheel means includes a rear axle and said first positioning means includes a strut for selectively holding said front and rear axles apart by a predetermined distance, a second strut member disposed between an intermediate portion of the frame and said front axle.*

* * * * *